US012626578B2

(12) United States Patent
João et al.

(10) Patent No.: US 12,626,578 B2
(45) Date of Patent: May 12, 2026

(54) HYBRID METHOD AND SYSTEM FOR MULTI SCENARIO DROWSINESS DETECTION AND METHOD FOR DATA PROCESSING USING REAL-TIME AND HISTORICAL DATA ON WEARABLE DEVICES

(71) Applicant: SAMSUNG ELETRÔNICA DA AMAZÔNIA LTDA., São Paulo (BR)

(72) Inventors: Renato Stoffalette João, Campinas (BR); Paulo Augusto Alvez Luz Viana, Campinas (BR); Klairton Lima Brito, Campinas (BR); Lizeth Stefania Benavides Cabrera, Campinas (BR); Sofia Gelio Da Silva, Campinas (BR); Ruan Robert Bispo Dos Santos, Campinas (BR); Gustavo Pessoa Caixeta Pinto Da Luz, Campinas (BR); Jaime Armando Delgado Vargas, Campinas (BR); Everton Zaccaria Nadalin, Campinas (BR); Paula Gabrielly Rodrigues, Campinas (BR); Frank Alexis Canahuire Cabello, Campinas (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 45 days.

(21) Appl. No.: 18/630,345

(22) Filed: Apr. 9, 2024

(65) Prior Publication Data

US 2025/0252838 A1 Aug. 7, 2025

(30) Foreign Application Priority Data

Feb. 7, 2024 (BR) ...................... 10 2024 002538 5

(51) Int. Cl.
*G08B 21/06* (2006.01)
*G08B 7/06* (2006.01)
*G08B 31/00* (2006.01)

(52) U.S. Cl.
CPC ............... *G08B 21/06* (2013.01); *G08B 7/06* (2013.01); *G08B 31/00* (2013.01)

(58) Field of Classification Search
CPC ........ G16H 50/20; G16H 50/30; G16H 40/67; G16H 20/70; G16H 40/63; G16H 50/70;
(Continued)

(56) References Cited

U.S. PATENT DOCUMENTS

| | | | |
|---|---|---|---|
| 9,283,847 | B2 | 3/2016 | Riley et al. |
| 10,390,748 | B2 | 8/2019 | Lee et al. |

(Continued)

FOREIGN PATENT DOCUMENTS

| | | | |
|---|---|---|---|
| CN | 105899129 | A | 8/2016 |
| EP | 3 132 739 | B1 | 2/2022 |
| JP | 2007164366 | A | 6/2007 |

OTHER PUBLICATIONS

Thomas Kundinger "Driver Drowsiness Detection Systems: Potential of Smart wearable Devices to Improve Vehicle Safety", Johannes Kepler University Linz, published in Jun. 2021; 209 pages.

(Continued)

*Primary Examiner* — Daniel Previl

(57) ABSTRACT

A system and method for drowsiness detection by a wearable device (smartwatch or smart ring), which constantly records and processes physiological and behavioral signals combined with historical user data. The system and method actively monitor the user's state, and using signal processing and machine-learning module, detect when the user is entering in a drowsy state. Based on the drowsiness detection module identifying a non-drowsiness an output of a drowsi- (Continued)

ness detection is directly fed back for future re-evaluation, and based on the drowsiness detection identifying a drowsiness state as being detected, an alert is provided to the user.

19 Claims, 8 Drawing Sheets

(58) Field of Classification Search
CPC ........ G16H 10/60; G16H 15/00; G16H 20/30; G16H 50/50; G16H 20/60; G16H 10/20; G16H 20/00; G16H 20/10; G16H 10/40; G16H 30/40; G16H 40/40; G16H 20/13; H04W 4/80; H04W 52/0235; H04W 84/18; H04W 48/10; H04W 56/0015; H04W 48/16; H04W 84/20; H04W 12/03; H04W 4/021; H04W 4/38; H04W 88/06; H04W 4/12; Y02D 30/70; H04B 1/713; H04B 1/385; G06F 16/24578; G06F 16/337; G06F 16/9535; G06F 21/6245; G06F 16/904; G06F 16/2358; G06F 16/24573; G06F 16/24575; G06F 21/32; G06F 16/29; G06F 16/587; G06F 3/011; G06F 9/455; G06F 1/163; G06F 1/1684; G06F 16/00; G06F 16/2365; G06F 16/2433; G06F 16/5866; G06F 16/907; G06F 16/908; G06F 3/012; G06F 3/013; G06F 40/295; G06F 40/35; G06F 40/56; G06F 9/542; G06F 11/3006; G06F 11/3409; G06F 16/285; G06F 16/55; G06F 18/214; G06F 3/015; G06F 3/0481; G06F 3/04817; G06F 3/0486; G06F 3/0488; G06F 9/451; G06K 7/10297; G06N 20/00; G06N 3/09; G06N 3/0464; G06N 7/01; G06N 3/044; G06N 3/0442; G06N 3/08; G06N 3/045; G06N 3/084; G06N 5/04; G06N 3/047; G06N 3/063; G06N 3/0895; G06N 5/02; G06N 20/10; G06N 20/20; G06N 3/04; G06N 3/0475; G06N 3/0499; G06N 3/088; G06N 3/094; G06N 5/01; G06N 5/046; A61B 5/02055; A61B 5/0816; A61B 5/14546; A61B 5/165; A61B 5/0022; A61B 5/01; A61B 5/0205; A61B 5/021; A61B 5/14532; A61B 5/7267; A61B 5/02405; A61B 5/4815; A61B 5/7282; A61B 5/389; A61B 5/6898; A61B 5/7264; A61B 5/746; A61B 5/024; A61B 5/14517; A61B 5/318; A61B 5/4806; A61B 2503/20; A61B 5/0004; A61B 5/02438; A61B 5/1118; A61B 5/4809; A61B 5/4812; A61B 5/4818; A61B 5/4836; A61B 5/7405; A61B 5/0077; A61B 5/026; A61B 5/0531; A61B 5/08; A61B 5/11; A61B 5/1112; A61B 5/112; A61B 5/117; A61B 5/448; A61B 5/486; A61B 5/6802; A61B 5/6824; A61B 5/6846; A61B 5/7275; A61B 5/742; A61B 5/743; A61B 5/7435; A61B 2560/0247; A61B 2560/0252; A61B 2562/0219; A61B 5/02416; A61B 5/0533; A61B 5/14542; A61B 5/168; A61B 5/369; A61B 5/398; A61B 5/4872; A61B 5/681; A61B 2503/40; A61B 5/0031; A61B 5/0537; A61B 5/076; A61B 5/1072; A61B 5/14539; A61B 5/1459; A61B 5/16; A61B 5/372; A61B 5/4082; A61B 5/4088; A61B 5/4803; A61B 5/6804; A61B 5/74; A61B 5/0042; A61B 5/14551; A61B 5/257; A61B 5/291; A61B 5/296; A61B 5/304; A61B 5/332; A61B 5/375; A61B 5/4857; A61B 5/6801; A61B 5/6814; A61B 5/7475; G06Q 50/01; G06Q 30/0203; G06Q 30/0282; G06Q 10/101; G06Q 30/02; G06Q 30/0201; G06Q 50/12; G06Q 10/04; G06Q 10/067; G06Q 50/265; G06Q 10/063; G06Q 20/321; G06Q 20/3276; G06Q 2220/00; G06Q 30/0251; G06Q 10/06312; G06Q 10/0832; G06Q 10/08355; G06Q 30/0621; G06Q 30/0631; G06Q 30/0635; G06Q 10/06398; G06Q 30/018; G08B 21/16; G08B 21/0453; G08B 25/10; G08B 21/0446; G08B 21/14; G08B 25/016; G08B 25/14; G08B 13/19613; G08B 21/0423; G08B 21/06; G08B 25/08; G08B 31/00; G08B 7/06; H04L 63/0442; H04L 63/0861; H04L 9/3231; H04L 63/0435; H04L 63/0478; H04L 63/0853; H04L 9/0833; H04L 9/085; H04L 9/0869; H04L 9/30; H04L 9/3239; H04L 9/3255; H04L 9/50; H04L 51/046; H04L 67/10; H04L 2209/34; H04L 2209/46; H04L 43/0811; H04L 51/222; H04L 51/234; H04L 67/12; H04L 67/125; H04L 67/306; H04L 67/52; H04L 9/0825; H04L 9/0866; H04L 9/0894; H04L 9/14; H04L 9/3271; H04L 51/02; H04L 51/10; H04L 51/18; G01N 27/4075; G01N 33/66; G06V 20/80; G06V 10/25; G06V 20/20; G06V 10/764; G06V 20/56; G06V 10/19; G06V 10/56; G06V 10/761; G06V 10/771; G06V 10/82; G06V 20/625; G06V 40/45; G06V 10/22; G06V 10/443; G06V 10/75; G06V 10/751; G06V 10/776; G06V 40/193; A63B 2220/72; A63B 2220/75; A63B 24/0062; A63B 2024/0065; A63B 2071/0625; A63B 2220/17; A63B 2220/62; A63B 2220/76; A63B 71/0622; A63B 2220/12; A63B 2220/74; A63B 2220/803; A63B 2220/836; A63B 2225/50; A63B 2225/54; A63B 2230/06; A63B 2230/30; A63B 2230/42; A63B 2230/50; A63B 2230/60; A63B 2230/65; A63B 71/06; H04M 1/72454; H04M 1/27453; H04M 1/72421; H04M 2250/12; G02B 2027/0138; G02B 2027/014; G02B 27/0172; G02B 2027/0178; G16Y 10/60; G01C 21/005; G01C 21/30; G01C 21/6804; G01C 21/343; B60W 2050/0075; B60W 2050/0088; B60W 2420/403; B60W 2540/221; B60W 2540/225; B60W 30/16; B60W 50/085; B60W 50/10; H04R 1/028; H04R 1/08; H04R 1/1016; H04R 1/1041; H04R 2420/07; H04R 3/04; G01P 13/00; A63F 13/61; A63F 13/67; A63F 13/80; A61N 1/36025; A61N 1/36082; A61N 1/36139
USPC ....... 340/575, 561, 568.8, 571, 588, 636.19, 340/539.12, 691.6, 692, 825.28, 825.29, 340/5.32
See application file for complete search history.

(56) References Cited

U.S. PATENT DOCUMENTS

| | | | | |
|---|---|---|---|---|
| 10,532,658 | B2 | 1/2020 | Kim et al. | |
| 10,646,168 | B2 | 5/2020 | Kannan et al. | |
| 10,966,647 | B2 | 4/2021 | Galm et al. | |
| 11,033,214 | B1 * | 6/2021 | Belkacem | A61B 5/389 |
| 11,033,228 | B2 | 6/2021 | Maris et al. | |
| 11,195,616 | B1 * | 12/2021 | Seemakurty | A61B 5/742 |
| 11,412,970 | B2 | 8/2022 | Kusukame et al. | |
| 2005/0046584 | A1 * | 3/2005 | Breed | B60N 2/02246 340/13.31 |
| 2007/0086624 | A1 * | 4/2007 | Breed | B60R 21/01552 382/104 |
| 2010/0109881 | A1 * | 5/2010 | Eskandarian | B60K 28/066 340/576 |
| 2011/0043350 | A1 | 2/2011 | David | |
| 2016/0001781 | A1 * | 1/2016 | Fung | G07C 9/37 701/36 |
| 2016/0196758 | A1 * | 7/2016 | Causevic | A61B 5/165 434/236 |
| 2016/0207454 | A1 * | 7/2016 | Cuddihy | G08B 6/00 |
| 2017/0209053 | A1 * | 7/2017 | Pantelopoulos | A61B 5/7278 |
| 2020/0155054 | A1 * | 5/2020 | Slater | A61B 5/08 |
| 2021/0169417 | A1 * | 6/2021 | Burton | A61B 5/4857 |
| 2021/0212620 | A1 | 7/2021 | Galm et al. | |
| 2022/0015654 | A1 | 1/2022 | Groppo | |

OTHER PUBLICATIONS

Emma Perkins et al., "Challenges of Driver Drowsiness Prediction: The Remaining Steps to Implementation", published on Sep. 17, 2021; pp. 1-17.

Aguilar et al., "Variation of the Heartbeat and Activity as an Indicator of Drowsiness at the Wheel Using a Smartwatch", Regular Issue; published in Jun. 2015; 5 pages.

Díz-Santos et al., "Drowsiness Detection in Drivers With a Smartwatch", University of La Laguna, published on Oct. 8, 2022; 12 pages.

Fujiwara et al., "Heart Rate Variability-Based Driver Drowsiness Detection and Its Validation With EEG", IEEE Transactions on Biomedical Engineering, vol. 66, No. 6, Jun. 2019; pp. 1769-1778.

Colić, Aleksandar et al., "Driver Drowsiness Detection Systems and Solutions," Springer Science+Business Media, 2014.

* cited by examiner

HYBRID METHOD AND SYSTEM FOR MULTI SCENARIO DROWSINESS DETECTION AND METHOD FOR DATA PROCESSING USING REAL-TIME AND HISTORICAL DATA ON WEARABLE DEVICES

CROSS-REFERENCE TO RELATED APPLICATION(S)

This application is based on and claims priority under 35 U.S.C. § 119 to Brazilian Patent Application No. BR 10 2024 002538 5, filed on Feb. 7, 2024, in the Brazilian Intellectual Property Office, the disclosure of which is incorporated by reference herein in its entirety.

TECHNICAL FIELD

The present invention relates to systems and methods for drowsiness detection by a wearable device (smartwatch or smart ring), which constantly records and processes physiological and behavioral signals combined with historical user data. More specifically, the systems and methods of the present invention actively monitors the user's state, and by means of signal processing and machine-learning modeling, detects when the user is entering in a drowsy state.

The present invention can serve as a monitoring and alerting system for long journey drivers, thus collaborating to reduce traffic accidents. It can also serve as an alert system for heavy machinery operators and alert the operator prior to entering in a life risky situation. It can serve as an alert system for healthcare professionals and those with long working hours, as a system to alert professionals about their current level of attention and reduce the risk of health-related incidents.

BACKGROUND OF THE INVENTION

Drowsiness (or sleepiness) can be defined as the propensity of falling asleep and is characterized by a low arousal level and propensity to doze off, which is generally related to the feeling of lethargy, tiredness or sleepiness. The drowsy state can be caused by different factors such as sleep deprivation, medical conditions, and sleep disorders. Even with an adequate sleep time, the drowsiness state can occur, and it may be dangerous in several daily activities, such as working or driving.

When drowsiness occurs at inappropriate times, particularly during activities that require complete alertness, it becomes a problem that can cause serious consequences not only for the person who is in a drowsy state, but also for other people around. For instance, a driver who loses control of the vehicle and may end up hitting pedestrians, or a machinery operator who does not notice a person approaching during operation and causes an accident. Drowsiness is considered the main cause of thousands of accidents on highways.

According to the International Association of Oil & Gas Producers (IOGP), sleepiness contributes to approximately 1 out of 5 fatal and serious road accidents. The IOGP also estimates that a drowsy driver is three times more likely to be involved in a road crash.

Furthermore, drowsiness directly interferes with cognitive function, which includes memory, attention and decision making, reducing productivity and performance in tasks that require mental focus. In addition to the problems that drowsiness can cause during daily activities, in some cases it can be a symptom of underlying medical conditions that may require medical attention, such as sleep apnea, diabetes, depression, etc.

In the last decade, wearable devices have become very popular and countless applications in the healthcare field have been designed. One of the reasons for the popularity of such devices is the possibility to measure and analyze biological signals captured using non-invasive sensors such as accelerometers, thermometers, and light pulses. The data collected by such sensors can be used to detect and prevent serious incidents that may occur due to drowsiness. According to the prior art, there are four major and mostly used systems to detect drowsiness:

- Vehicle-based systems: based on sensors placed on various components of the vehicle, including steering wheel, pedal, etc.
- Behavioral-based systems: based on body movements, accelerometers, facial expressions, and head movements, for example frequent yawning, head tilt, eye blinking, etc.
- Physiological-based systems: based on physiological signals, for example heart rate, skin impedance, body temperature, etc.
- Hybrid systems: based on the combination of other systems, for example Physiological and Behavioral, Behavioral and Vehicle-based, or Physiological and Vehicle-based.

Drowsiness detection based on wearable devices presents numerous challenges. Usually, the information regarding the facial expressions (i.e., yawning and eyes movements), vehicle sensors, or that require an image processing are not available, and thus making it harder to detect the drowsy state. However, adopting a hybrid approach, which combines non-intrusive physiological, behavioral, and historical information tends to provide good results and shows a better accuracy in comparison to other approaches.

Furthermore, drowsiness detection using wearable devices on the wrist brings a significant advantage from an economic standpoint when considered for an industrial purpose, since there is no need to install any expensive device/sensor in the vehicle or at the workstation. It is important to note that the hybrid approach also has inherent challenges. For instance, dealing with signals extracted from the human body in real time is susceptible to noise, but there are several techniques that can be used to remove or reduce the impact of this problem.

The present invention discloses a novel hybrid systems and methods for drowsiness detection at wearable devices, such as smartwatches and smart rings. The systems and methods of the present invention use physiological and behavioral data collected in real-time by sensors combined with historical user data. The user's historical health information is relevant and should be considered because a user's previous health conditions can impact their current health condition. For example, if a person has a chronic illness such as diabetes, this may influence their current tiredness; if a person has been sleep deprived in recent days, s/he may be more inclined to fall asleep.

According to the American Academy of Sleep Medicine Scoring Manual, 'Drowsy' is defined as the moment where the individual is close to or in N1 stage (sleep onset). In the prior art, this corresponds approximately to the interval between 15 minutes before the first N1 stage (sleep onset) and 5 minutes after the first N1 stage. During N1, the muscles are still active (eyes open and close moderately), and one can be easily awakened by a sensorial stimulus. So, drowsiness is detected a few minutes prior to the N1 stage, when an individual can be easily alerted by a sensorial stimulus.

The drowsiness state happens in a short window of time, which usually occurs a few minutes before the sleep onset. However, since the physiological and behavioral data are collected from sensors that are susceptible to noise, it may cause two main problems:

(i) non-reliable and noisy reading values; and (ii) false positive triggers, so when activated, the drowsiness detection must be verified frequently.

For the first problem, it is possible to select the most reliable values and apply filters to remove or reduce noise in the collected signals. Reducing noise in the collected signals may become a problem considering user experience. For example, a sudden alert can be an issue that bothers users, if it is not calibrated correctly in case of false positives. To avoid such a problem, some initiatives can be included, such as metrics to reduce false positives when training machine learning models. Furthermore, the act of triggering the notification to the user can be calibrated, through a sensitivity adjustment, according to the user's preferences with different waiting times after drowsiness is detected, to ensure that it has been detected. The signal quality of sensor measurements can be checked and dynamically change the waiting time, so that when the user is not using the device properly or the sensors have a high noise rate, it adapts to show only meaningful notifications.

To improve the predictions and reduce the number of false positives in different scenarios, it is possible to implement personalized modes according to the situation, in which drowsiness is being detected. Moreover, this functionality can also be integrated with activity recognition algorithms so it can be triggered automatically.

Besides, the historical user information (health and fitness) may help the system to improve the predictions reducing the number of false positives. Sleep-deprived users are more susceptible to be drowsy, while performing tedious or low-intensity activities. Night shift workers also have increased daytime sleepiness.

Chronic diseases are also an important historical information that can influence the prediction of the drowsiness state. For example, depression is a serious health condition that makes an individual to be more susceptible to feel episodes of drowsiness during the day.

All this information can be collected from historical data to profile users and better estimate drowsiness, both from physiological and behavioral measurements in real time and from this historical collected context.

The objective of the present invention is to provide hybrid systems and methods on a wearable device, by collecting physiological signals and behavioral measurements produced by embedded sensors, together with the historical user information to detect the drowsiness state in real-time.

Since the drowsiness state can be caused by previous factors, the present invention discloses a data fusion approach to combine the signals from the sensors and the historical user information.

The thesis "Driver Drowsiness Detection Systems: Potential of Smart wearable Devices to Improve Vehicle Safety", published in June 2021, by Thomas Kundinger, investigates the usage of physiological data collected by wearables in the automotive context.

The book "Driver drowsiness detection: Systems and solutions", published on September 27, pages 10-14, 2014, by Colic at al., depicts an overview of the different drowsiness detection systems, presenting measurement methods, commercial solutions, and some examples available.

The article "Challenges of Driver Drowsiness Prediction: The Remaining Steps to Implementation", published on Sep. 17, 2022 by Emma Perkins et al., performs a review of 126 works and clarifies the advantages and disadvantages of each approach. Detecting drowsiness using typical wearable devices presents challenges, as the information from facial expressions, yawning, eyes movements and questionnaires are not taken into consideration, yet drowsiness can still be detected with high accuracy. The accuracy increases even more with hybrid approaches that combine non-intrusive physiological and behavioral measures, providing the user little concern about privacy. Moreover, the absence of the need to install any costly devices at the vehicle is a plus.

Wearables collect signals extracted directly from the human body in a non-invasive manner to detect the sleep onset in a more reliable manner than methods that require image processing.

The drowsiness state occurs shortly before the first sleep stage when the individual does not show many visual signs. When yawning is present, it can be already too late to present the user a warning. Some disadvantages of using a physiological approach are the susceptibility to noise and intrusiveness, where the former can be solved by employing a wide range of signal processing techniques and the latter can be minimized by using wearables and data extracted by photoplethysmography (PPG) as an alternative to electrocardiogram (ECG).

The article "Variation of the Heartbeat and Activity as an Indicator of Drowsiness at the Wheel Using a Smartwatch", published in June 2015, by Aguilar et al., proposes a technique to detect drowsiness based on accelerometer, pedometer and gyroscope sensors using Fast Fourier Transform combined with the average heart rate. Drowsiness is only detected when both methods indicate to drowsiness, each one having equal weights.

Another similar approach is present in the article "Drowsiness Detection In Drivers With A Smartwatch", published on Oct. 8, 2022, Diaz-Santos et al., the authors proposed a technique to detect drowsiness based on the physiological measures of the heart rate, stress, blood pressure and blood oxygen combined with accelerometer, gyroscope, pedometer and Global Position System (GPS). Data is not processed at the device, relying at using a smartphone connected to the smartwatch. The present invention, in opposition, also includes the historical user information in conjunction with the motion sensors. The inclusion of the historical data can give an insight about the subject's state on the past days that can influence the drowsiness level, such as the sleep quality on the last days. Besides, the present invention, runs in real time at the wearable device, using less inputs, which reduces complexity and allows the usage of the solution at different contexts.

Article "Heart Rate Variability-Based Driver Drowsiness Detection and Its Validation With EEG", published on Nov. 2, 2018, by Fujiwara et al., proposes an algorithm to discriminate between driver statuses of "awake" and "drowsy", where "drowsy" means that the driver is close to or in N1. In the proposed method, eight HRV (heart rate variability) features are adopted as input variables. The features are obtained from the R-to-R interval (RRI) data and the EEG data, collected from experiment participants (drivers) while they drove a virtual vehicle on a simulator. The algorithm used to detect the anomaly is based on multivariate statistical process control. It proposes an EEG-Based Sleep Scoring considering that drivers may already feel drowsiness before N1 stage. The present invention also detects drowsiness before the N1 stage; however, the system uses other features (such as historical data) as input of the machine learning model.

Patent document U.S. Pat. No. 10,646,168B2, entitled "Drowsiness Onset Detection", published on Aug. 2, 2018, by Microsoft Technology Licensing LLC, defines drowsiness as the N1 stage of sleep and uses one or more heart rate (HR) sensors for detecting drowsiness. The HR sensor is used to compute the heart variability signal, from which many features can be derived. The patent describes the general usage of HRV features for detecting the onset of drowsiness by an artificial neural network and it also covers an implementation where a cloud service receives a notification when it detects the onset.

The system of the present invention is different in the sense that it may combine physiological and behavioral data from many days, captured by different sensors, including sleep behaviors, exercise sessions, step count and others. Moreover, it is important to bear in mind that the use of historical data may reveal important features that can be directly related with the current state of the user, and it can enable to personalize thresholds for each user in the drowsiness detection algorithm.

Patent document U.S. Pat. No. 9,283,847B2, entitled "System and Method to Monitor and Alert Vehicle Operator of Impairment", published on Nov. 5, 2015, by State Farm Mutual Automobile Insurance Co., claims the use of a wearable processing device for capturing data and providing an alert when driver impairment is detected. The collected data that may be used for drowsiness detection may be one or more of: X-axis accelerometer, Y-axis accelerometer, Z-axis accelerometer, GPS unit, optical sensor (for image data capturing of head and eye movements), a thermometer for body temperature measurement, thermal image data of the vehicle operator, microphone for voice capturing, electroencephalography, galvanic skin sensor, heart rate monitor, alcohol sensor for the driver's breath or for the air inside de vehicle. In the embodiments, each sensor can be used to calculate a score and each score can be weighted and summed to a drowsiness score and another system is used to determine if the driver is impaired. The present invention presents a system and method that operates in a wearable device and is not limited to driver drowsiness, as it works in any potential activity.

Patent document US20210212620A1, entitled "Drowsiness detection", published on Jul. 15, 2021, by Garmin Switzerland GmbH, uses the beat-to-beat interval of the heart rate and the vehicle speed to determine the mental state of the driver. In some embodiments, the mental state can be drowsiness and the claimed system may determine their drowsiness level. This level can be communicated to other systems for taking further actions if necessary. Embodiments may include heart rate variability and inertial measurement unit outputs. The mentioned document US20210212620A1 presents the operation of a method of detecting a user's mental state using different variants and describes the steps for data collection and analysis of heart rate signals to determine a mental state and how to use the mental state. In the mentioned Document US20210212620A1, the heart rate signal is received from the sensor, and it is analyzed to determine the heart rate variability, i.e. variation in time between consecutive heartbeats and a beat-to-beat interval (BBI). Larger short-term variations in the BBI curve are commonly attributed to states of drowsiness and long-term variations in the BBI curve are commonly attributed to tension/stress states. The combination of stress and drowsiness (here called fatigue) means that a subject is drowsy and does not have the ability to relax. In this case, both the sympathetic and parasympathetic nervous systems are very active. In contrast, the present invention is not limited to drowsiness detection of drivers and uses historical physiological and behavioral data for the drowsiness assessment.

Patent document EP3132739B1, entitled "Enhancing Vehicle System Control", published on Feb. 23, 2022, by Polar Electro Oy, aims to control vehicle operator alertness. The embodiment comprises the use of cardiac activity data and embodiments may comprise the use of real-time cardiac activity, cardiac history activity, electromyogram (EMG), electrooculogram (EOG), EEG, PPG, sleep history, exercise history, respiration rate of the operator and personal characteristics of the operator, which may be gender, age, height, maximum heart rate, resting heart rate, fitness level and body composition. In an embodiment, the apparatus is a wrist device worn by the person. The cardiac activity may be used for calculating HR, Heart Beat Interval (HBI) and HRV. Embodiments may also use a motion circuitry as an accelerometer, gyroscope, magnetometer, and GPS. An embodiment may use input data to calculate one or more alertness value, which can be used for calculating an alertness level. As in many patents, it claims the detection of drowsiness for vehicle operators. The present invention is not limited to driver drowsiness detection and can be used for daily activities.

Patent document U.S. Pat. No. 11,033,228B2, entitled "Wearable fatigue alert devices for monitoring the fatigue status of vehicle operators", published on Apr. 9, 2020, by Centenary University, uses a device embedded in a wrist-worn housing. The device captures bio signals to determine whether the wearer is becoming fatigued. It claims the usage of electrodermal activity (EDA) for evaluating the fatigue status, but embodiments may also comprise an optical sensor for eye tracking (also for gathering information about fatigue and alertness), blood pressure monitoring and heart rate monitoring. The Patent document U.S. Pat. No. 11,033,228B2 also claims a system for displaying, alerting and/or controlling the vehicle upon receiving the fatigue status from the device. In contrast, the present invention is not limited to driver drowsiness detection and can be used for daily activities.

Patent document US20220015654A1, entitled "Photoplethysmography based detection of transitions between awake, drowsiness and sleep phases of a subject", published on Jan. 20, 2022, by Sleep Advice Technologies Srl, describes the usage of PPG for detecting the transition between Wake, Drowsy and Sleep states. The system processes the acquired PPG signal and extracts information about the signal's morphology, frequency, and energy. The system may also calculate the subject's HRV for further information processing and extraction. The claimed model for detecting the transitions is a Learning and Adaptive control Matrix. The patent document US20220015654A1 also refers to the usage of accelerometer and gyroscope for detecting when the subject is inactive and humidity, ambient light level and temperature for artefact removal, calibration of PPG and validation of sleep status. The present invention is not solely based on PPG, as it may use other physiological measurements and sensors, sleep history and activity history.

Patent document US20110043350A1, entitled "Method and system for detecting the physiological onset of operator fatigue, drowsiness, or performance decrement", published on Feb. 24, 2011, by IVS INTEGRATED VIGILANCE SOLUTIONS Ltd, describes a method and system for detecting the drowsiness, fatigue, or impaired performance onset on operators of vehicles (or similar apparatus). The method described acquires data from the grip pressure sensors on a steering wheel (or similar adaptation) and describes a dynamic offset removal in the sensors in order to avoid unreliable readings when sensors are not pressed. For instance, a non-zero reading is recorded when operator does not press the sensors. Besides, a signal selection and normalization procedure are explained to collect the data that are physiologically significant to detect the drowsiness state. At last, an adaptive and non-adaptive drowsiness pattern detection is presented, and the automatic and manual activation of the system is described. The system of the present invention is different in the sense that it considers historical sleep data for the drowsiness detection and estimation and may use other data sources such as exercise sessions. Also, it is not dependent on vehicle-based measures such as gripping force exerted by the operator and can operate in a wearable device for multiple applications.

Patent document CN105899129A, entitled "Fatigue monitoring and management system", published on Aug. 24, 2016, by Resmed Sensor Technologies Ltd, describes systems and methods for monitoring and managing fatigue. The authors define fatigue as a state of impairment, including physical and/or psychological factors, associated with reduced alertness and decreased performance, caused by poor sleep quality, sleep deprivation, sleep disruption, among others. The fatigue monitoring system can utilize different methods to generate a fatigue state assessment, such as a nonlinear classifier, a support vector machine, or a neural network. The input parameters of the classifier may include the following sets: lifestyle parameters (caffeine intake, pressure level, energy level, mindset and perceived sleep quality); objective sleep measurement (Heart rate, respiration rate, biological exercise level, electro dermal response and body temperature); sleep statistics (sleep duration, sleep quality, number of sleep interruptions, REM sleep duration, awaken after falling asleep, sleep inertia and sleep latency); furthermore, the system include devices configured to capture daytime vital signs (e.g., pedometers, "step counters", activity monitors based on three-axis accelerometers, altimeters) data of a user; a device configured to capture subjective data and objective measurements (obtained from a test) of user fatigue or drowsiness. The input data can be subjected to a non-linear transformation and can be normalized. However, no details are provided about the signal preprocessing, feature selection or feature fusion.

Patent document JP2007164366A, entitled "Sleepiness Prevention Information Presenting Device, Sleepiness Prevention Information Presenting System, Program and Recording Medium", published on Jun. 28, 2007, by Kokuritsu Seishin Shinkei Center and Central Japan Railway Co., describes a drowsiness prevention system based on lifestyle history information (for the past 10 days or more), aiming to prevent sleepiness during work by presenting the period of time to be considered. Lifestyle history information includes a sleep acquisition period indicating a period, in which the user acquires sleep and a work time indicating an interval in which the user has worked. Furthermore, it includes physical condition information indicating the physical condition of the user. The sleepiness prevention information system includes a client and a server, and the client and the server are configured to be able to communicate via a communication network. The present invention is different in the sense that it considers historical data, as well as real time sensors data to predict drowsiness in multiple scenarios.

Patent document U.S. Pat. No. 10,532,658B2, entitled "Health measurement system for vehicle's driver and warning method using the same", published on Mar. 28, 2019, by Hyundai Motor Co. and Kia Motors Corp, discloses a health measurement system for a vehicle driver and a warning method. The health measurement system includes an Internet of Things (IoT) device and a controller. The controller performs health scanning of a driver through the IoT device and informs the driver of a result of the health scanning. The controller determines a necessary condition of the health scanning of the driver by analyzing traveling environment information and performs the health scanning only when the necessary condition of the health scanning is satisfied.

Patent document U.S. Pat. No. 10,390,748B2, entitled "Monitoring a driver of a vehicle", published on Dec. 10, 2015, by LG Electronics Inc, discloses a driver state monitoring (DSM) system including a wearable device main body worn by a user, a display unit, and an information collection unit that collects information related to a body state of the user. The DSM system includes a controller that, based on the collected information, senses a situation associated with the user's body state, and converts the collected information into a numerical value representing the body state of the user in context of the sensed situation. The controller further calculates a well-driving score for the user based on the numerical value that represents the body state of the user in context of the sensed situation; and controls at least one of the display unit or an image information output device to display the well-driving score and the numerical value that represents the body state of the user in context of the sensed situation.

Patent document U.S. Pat. No. 11,412,970B2, entitled "Method for predicting arousal level and arousal level prediction apparatus", published on Sep. 9, 2021, by Panasonic Intellectual Property Corp of America, discloses a method for predicting an arousal level used by a computer of an arousal level prediction apparatus that predicts an arousal level of a user. The method includes obtaining current biological information regarding the user detected by a sensor and calculating a current arousal level of the user based on the current biological information. The method further includes obtaining current environment information indicating a current environment around the user, and predicting a future arousal level, which is an arousal level a certain period of time later, based on the current arousal level and the current environment information. Based on the predicted future arousal level, the method further issues a notification to the user, or controls an operation of a device.

Patent document U.S. Pat. No. 10,966,647B2, entitled "Drowsiness detection", published on Jul. 25, 2019, by Garmin Switzerland GmbH, relates to a mobile electronic device that is operable to detect and display a mental state of a user such as drowsiness. The mobile electronic device includes a heartrate sensor, a processor, and a display. The heartrate sensor is operable to provide a heartbeat signal indicative of a heartbeat of the user. The processor is operable to acquire a beat-to-beat interval based upon the heartbeat signal and determine a drowsiness level of the user based at least in part upon the beat-to-beat interval.

SUMMARY

A hybrid system and method for multi scenario drowsiness detection. The hybrid system for multi scenario drowsiness detection using real-time and historical data on a wearable device may comprise a data acquisition module to acquire physiological and behavioral data from embedded sensors of the wearable device, a data processing module to process data by performing pre-processing and feature extraction, a drowsiness detection module to identify whether a user is drowsy, and an alert generation module to alert the user.

Based on the drowsiness detection module identifying a non-drowsiness state, an output of the drowsiness detection module is directly fed back in the data acquisition module for future re-evaluation, and based on the drowsiness detection module identifying a drowsiness state as being detected, the alert generation module alerts the user.

The combination of the features of the present invention is not obvious and the solution disclosed enables new possibilities for drowsiness detection including health data that impact on drowsiness but are not taken into consideration at traditional wearable approaches. Other important factor is that many approaches use more than one device to detect drowsiness, as a steering wheel, cameras, or other devices and our approach needs only a smartwatch as device, which is reliable, non-invasive and easy to implement.

BRIEF DESCRIPTION OF THE DRAWINGS

The objectives and advantages of the present invention will become clearer through the following detailed description of the example and non-limitative drawings presented at the end of this document.

DETAILED DESCRIPTION

Figure 1:
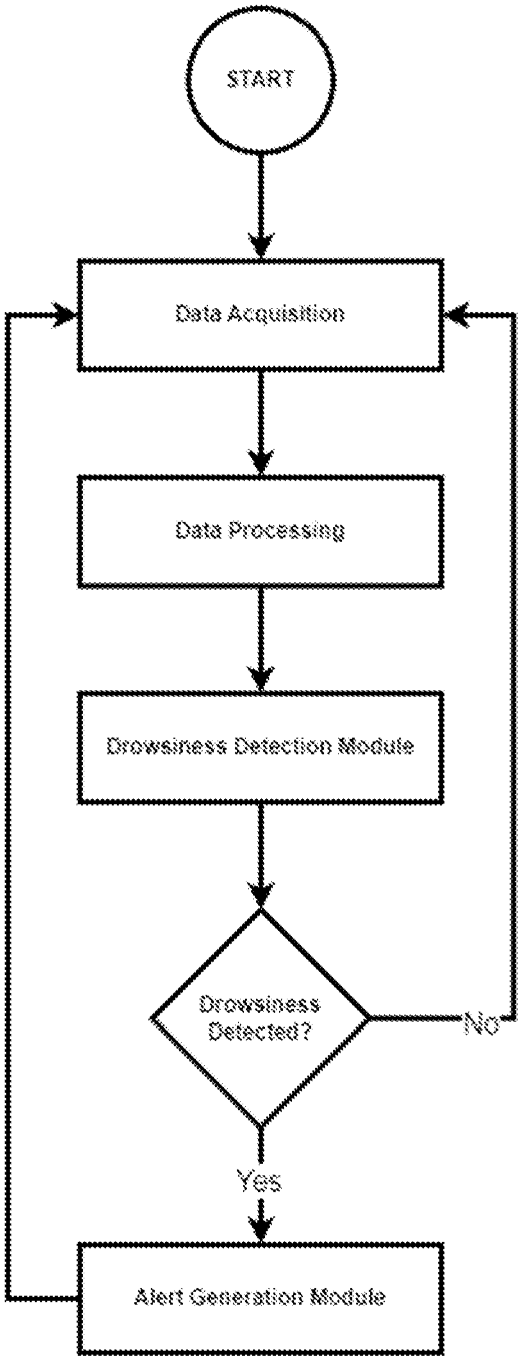
FIG. 1 illustrates a flow diagram of a method for multi scenario drowsiness detection according to an exemplary embodiment of the present invention.

The operation of the proposed systems, as well as the methods for detecting and alerting drowsiness in real-time can be fully understood by reading the following description.

The systems and methods of the present invention relates to techniques applied to detect and predict the user's state of drowsiness (sleepiness). The system of the present invention may collect both physiological and behavioral data in a non-invasive manner, throughout embedded sensors in a wearable device, such as smartwatch or a smart ring and recognizes the moment when an individual transitions from a wakefulness state to a drowsiness state. Furthermore, the proposed system uses historical and demographic information collected by onboard sensors over time.

The systems and methods of the present invention process physiological and behavioral signals combining such signals with the historical user information to feed a machine learning model that is calibrated to early detect signs of drowsiness in innumerous situations.

Intra-individual variability is defined by physiological aspects that can change with age, stress level, hunger, disease, hydration, and menstrual cycle. Such information provides a context that is highly informative of the instantaneous individual state. Individuals with a history of a high sleep debt are more prone to be drowsy at an earlier time after a full work week.

Highly active individuals have lower resting heart rate, so a heart rate value that is equal or slightly higher than the average can indicate some change in the individual status. By using sleep history, exercise history, and physiological and behavioral measures in a different scenario, it is possible to account for the intra- and inter-individual variations and provide a more accurate sleepiness prediction.

This hybrid system for drowsiness detection brings a machine learning module trained using physiological, behavioral, and historical user data combined that is possible to run on the wearable device.

One of the main advantages of the present invention rely on the fact that there is no need of external devices to perform the processing or additional sensors such as cameras and grip sensors to collect information about the environment. It is important to note that historical user data is updated periodically and one of the possibilities is to obtain such data via internet.

Even if the historical data update fails, the systems and methods of the present invention still works using the last data available. This approach is economically cheap, requiring no extra equipment and sensors other than those present in the wearable device. Besides, incorporating historical data allows to customize thresholds for each user, as users may respond differently to a similar health/fitness activity.

The present invention can serve as a monitoring and alerting system for long journey drivers, thus collaborating to reduce traffic accidents. It can also serve as an alert system for heavy machinery operators and alert the operator prior to entering in a life risky situation. It can serve as an alert system for healthcare professionals and those with long working hours, as a system to alert professionals about their current level of care and reduce the risk of health-related incidents.

FIG. 1 shows the operations of the hybrid method for multi scenario drowsiness detection using real-time and historical data on wearable devices. The first operation relates to acquiring physiological and behavioral data from embedded sensors of the wearable device. Then, second operation refers to pre-processing and feature extraction. Third operation relates to identifying if the user is drowsy or not based on the algorithm of the drowsiness detection module (107).

If a non-drowsiness state is produced at the drowsiness detection module (107), the output is directly fed back in the data acquisition module (101) for future re-evaluation. In another scenario, when a drowsiness event is detected, an alert is sent to the user.

Figure 2:
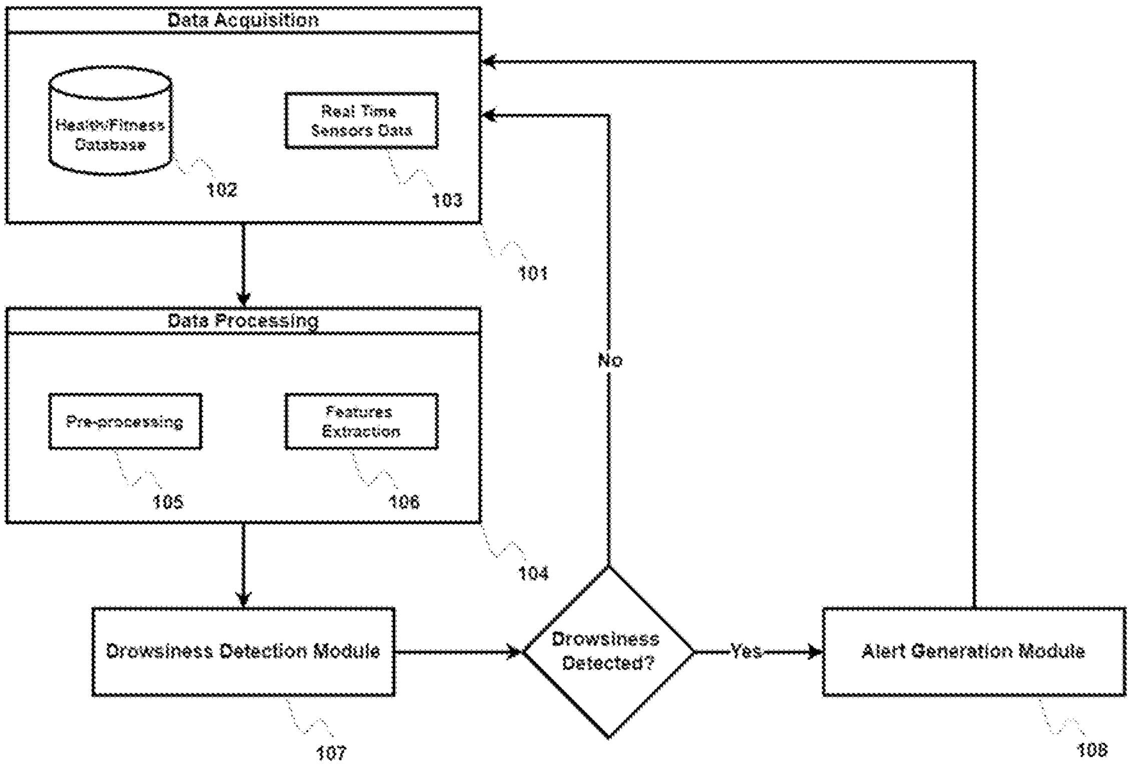
FIG. 2 illustrates a more detailed flow diagram of the drowsiness detection method and system according to an exemplary embodiment of the present invention.

FIG. 2 shows a more detailed flow diagram of the drowsiness detection method and system. The data acquisition module (101) includes a health/fitness database (102) with historical (physiological and behavioral) data and real time sensors data (103) collected from sensors that are embedded in the wearable device. The user data collected is then processed in the data processing module (104), which includes a pre-processing module (105) and a feature extraction module (106). The collected features are inserted into the drowsiness detection module (107), which runs an algorithm to identify whether the user is drowsy or not.

When the drowsiness detection module (107) produces a non-drowsiness state, the output is directly fed back in the Data acquisition module (101) for future re-evaluation. When a drowsiness event is detected, the alert generation module (108) alerts the user, which can be a visual notification on the screen, an audible notification, or a vibration signal. After the alert notification is received, the drowsiness record is fed back in the data acquisition module (101) for future re-evaluation. The drowsiness record contains information regarding the health/fitness and the sensors data that generated the drowsiness event.

Figure 3:
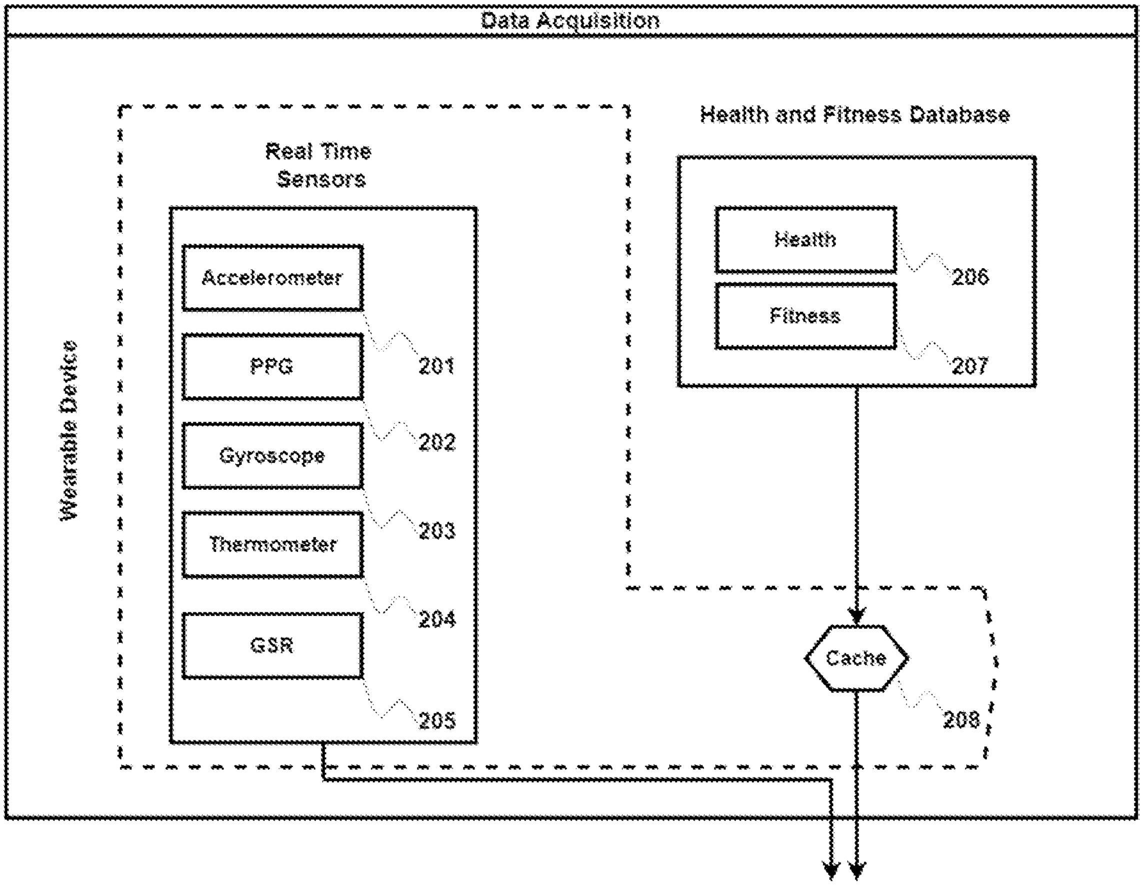
FIG. 3 illustrates a data acquisition module according to an exemplary embodiment of the present invention.

The data acquisition module in FIG. 3 includes real time sensors data, a health and fitness database and a cache component. The real time sensors, located in the wearable device, collect data from the accelerometer (201), PPG (202), gyroscope (203), thermometer (204) and the galvanic skin response (GSR) (205).

The accelerometer sensor (201) is used to detect a change in movement by measuring acceleration in three-dimensional space. For example, when an individual becomes drowsy, they tend to rub their eyes more frequently, the arms that hold the steering wheel tend to fall, etc. The PPG signal is used to collect information about the heart rate, blood pressure, etc. Any type of sensor that captures the PPG signal of an individual can be employed in PPG module (202).

The gyroscope sensor (203) is used for sensing the angular velocity. Similarly to the accelerometer, the gyroscope sensor (203) can demonstrate different hands movement patterns when entering a drowsiness state.

The temperature sensor (204) measures the skin surface temperature.

Furthermore, the GSR sensor (205) is used to measure the electrodermal activity of the skin. The electrodermal activity provides means to measure the activity in the sympathetic nervous system by the skin.

The remote health and fitness database, containing the health module (206) and fitness module (207), sends data to the cache (208) component which is located in the wearable. The health module (206) contains historical data related to stress, sleep quality, medicines, blood glucose and body composition. The fitness module (207) of the database contains historical data related to the muscle inflammation. The historical information is critical to the drowsiness detection method.

Figure 4:
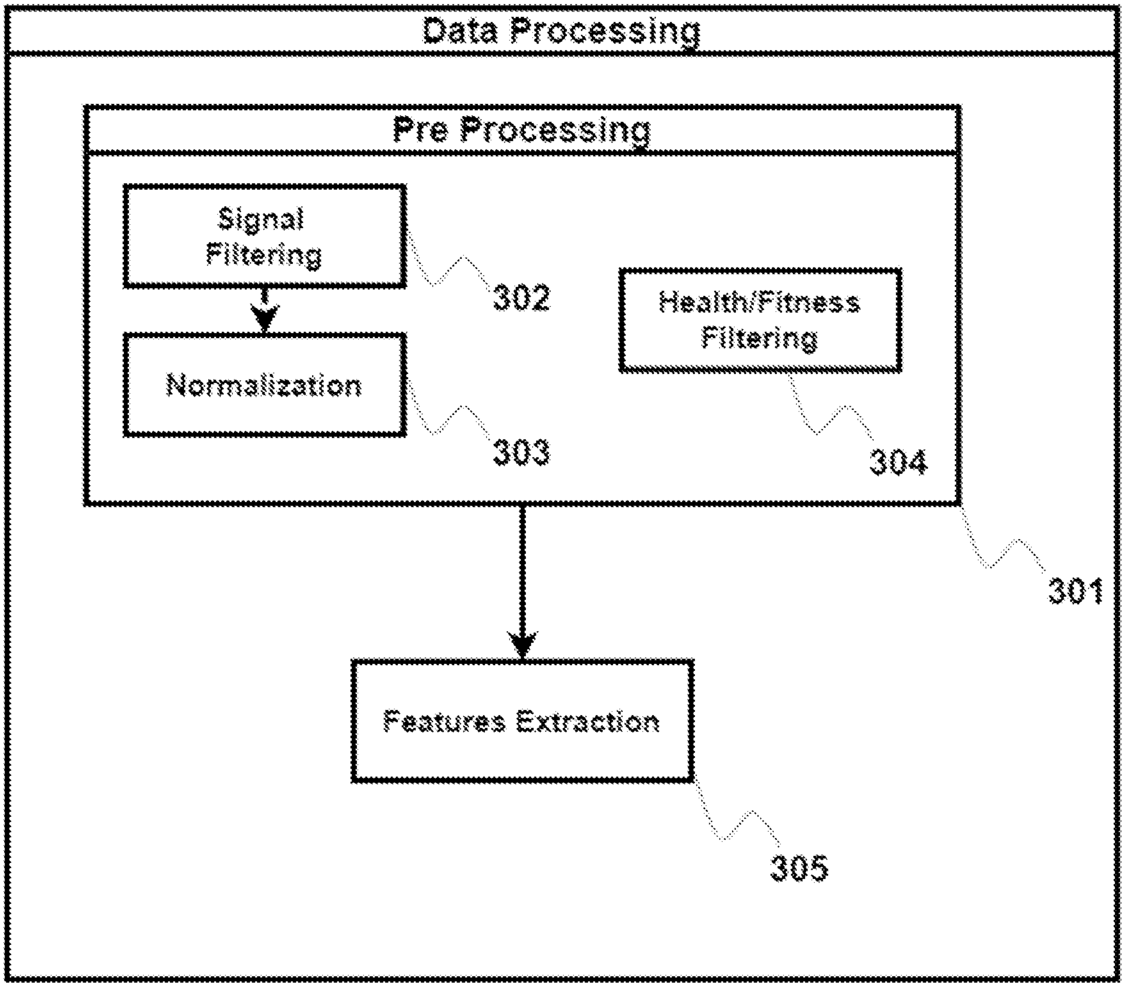
FIG. 4 illustrates a data processing module according to an exemplary embodiment of the present invention.

The data processing module shown in FIG. 4 includes a preprocessing (301) and a features extraction (305) component. In the preprocessing module (301), data is preprocessed to ensure its numerical ranges and features. For the signal filtering, the PPG signal is filtered to remove motion artifacts using an adaptive Least Mean Squares (LMS) technique, using the accelerometers as reference signals, then it is band pass filtered between 0.1 Hz and 5 Hz.

The GSR signals are low pass filtered with a cut frequency of 5 Hz. The gyroscope signals ($GYR_x$, $GYR_y$, $GYR_z$), in which x, y and z represents the three spatial axes in the coordinate system of the wearable, are low pass filtered with cut frequency of 15 Hz.

The historical data are also selected and filtered to remove unusual sleep and exercise sessions that may come from the database. The normalization (303) refers to rescaling PPG, accelerometer, gyroscope, and thermometer signals to predefined ranges. The health/fitness filtering (304) performs outlier detection and removal, i.e., too long/too short sleep sessions or exercise sessions, uncommon weight measurements.

The features extraction module (305) is divided in real-time signals features extraction and health/fitness features extraction.

Health and Fitness Features Extraction

The health and fitness features extraction may include the following metrics, but it is not limited to stress, muscle inflammation, sleep quality, medicine, blood glucose, body composition, and profile data.

Stress metrics are the activities performed by the user during the day that may cause stressful situations and, consequently, contribute to increase the state of fatigue, which later may cause the drowsiness episodes. For this reason, the systems and methods of the present invention may use as input a stress index, which can be measured by the user and provides a value in a range of 0 to 100, which is collected from the data source (206).

Muscle inflammation metrics are information about the user workout activities, which may indicate a relevant feature about the muscle fatigue. The system and method of the present invention uses a muscle wear index based on the following characteristics. W is the set of workouts performed by the user in the last 24 hours, $w_i$ represent a workout that belongs to W, such that $T(w_i)$, $I(w_i)$ and $D(w_i)$ indicates type, intensity, and duration in minutes of the workout $w_i$, respectively. The workout type ($T(w_i)$) is based on a coefficient related to the activity. Table 1 indicates examples of coefficients (workout type values).

TABLE 1

Illustrates some possible examples of coefficients that could be set to each $T(w_i)$.

| Workout Type | Coefficient |
|---|---|
| Walking | 0.5 |
| Running | 1.0 |
| Cycling | 1.4 |
| Hiking | 1.5 |
| Swimming | 1.3 |

It should be noted that Table 1 shows a small example of coefficient assignment, but this strategy may be performed considering different workout types and weight criteria.

The workout intensity ($I(w_i)$) is divided in scores 1, 2 and 3 indicating the normal, moderate, and vigorous level, respectively. The muscle wear index is defined as follows:

$$\sum_{w_i \in W} (\alpha \times T(w_i)) + (\beta \times I(w_i)) + (\delta \times D(w_i))$$

The elements α, β and δ in the muscle wear index represent weights associated with the type, intensity, and duration of the workout, respectively. The score obtained indicates the level of muscular fatigue generated during the workouts performed in the last 24 hours by the users, considering type, intensity and duration, which are collected from the data source (207). Workout activities with a high level of intensity and duration without an appropriate time of recovery may cause the drowsiness episodes.

Sleep deprivation is one of the main causes of drowsiness. The method uses user sleep quality history information, which is collected from the data source (206), to improve the predictions of the model. For each sleep session, the elapsed time (in minutes) and the score (value ranging from 0.0 to 1.0 indicating the sleep session quality) are extracted. Initially, the method for drowsiness detection computes data that tends to indicate if the amount and sleep sessions quality during a day reached a minimum level necessary for a full recovery.

Given a sleep session s, the duration (in minutes) and the score (indicating the quality) of the sleep session s is denoted by times(s) and score(s), respectively. $S_x$ is the set of sleep session of a user that occurred during a day x and M is the minimum time of rest required for the user during a day. Such value can be updated for each user and considering other characteristics like stress index, workout activities, etc.). $Q(S_x)$ gives a metric that indicates if the sleep sessions during a day x reached a minimum level necessary and is defined as follows:

$$Q(S_x) = \frac{\sum_{s \in S_x} \text{time}(s) \times \text{score}(s)}{M}$$

It should be noted that when the value of $Q(S_x)$ is greater than or equal to one, it tends to indicate that the user had at least a minimum number and duration of sleep sessions labeled with a good score during a day x. When the value of $Q(S_x)$ is less than one, it indicates the opposite. Since the method for drowsiness detection considers the user historical sleep information and a large sequence of days with sleep deprivation may increase the risk of drowsy state, the method for drowsiness detection uses a feature that considers the metric Q(S) of the last k days of the user but assigning more weight to recent days, wherein k is calibrated for each user. Assuming the day 0 refers to the present day and day j, such that j>0, refers to the j past days, the feature that consider the user historical sleep quality is calculated as the following:

$$\sum_{i=0}^{k} Q(s_i) \times \frac{1}{2^i}$$

It should be noted that using such score, the sleep quality of recent days has more weight associated, but the entire window interval is considered.

Another way to obtain the feature that consider the user historical sleep quality is adopting custom weights that may be dynamically updated based on the activities or characteristics of the users. Considering that the $w_i$ is the weight associated with the i-th last day, the feature is calculated as follows:

$$\sum_{i=0}^{k} Q(s_i) \times w_i$$

The use of medications may affect the metabolism or even cause somnolence as adverse effects. The present invention uses the historical medication usage as input, which is collected from the data source (206).

The level of glucose in the blood may affects the metabolism, and in high concentrations may cause diseases directly related with the continuous state of fatigue. The method for drowsiness detection uses estimated values that are collected from the data source (206).

Information about lean mass, fat mass, water and other elements related to the human body composition can be of great importance to estimate, for example, the level of a person physical conditioning. The percentage of lean mass, fat mass and water extracted from historical measurements of bio impedance tests performed by the user are collected. Those values are already stored in the data source (206).

Age, sex, weight, and height as profile data can also be collected from the data source (206).

Real-Time Signals Features Extraction

For the real time signals, the features extraction module (305) performs the features extraction and calculation for all measured inputs, after the pre-processing module (301). For each input signal, the features described in the present invention are extracted over windows of time that may be dynamically adjusted for each user.

The features extracted from the PPG sensor referring to the time interval between individual beats (IBI) of the heart as well as all other calculated features are: IBI mean $$\left(\overline{IBI} = \frac{1}{N}\sum_{i}^{N} IBI_i\right),$$

IBI maximum value ($\max_{IBI}=\max(\{IBI_1, \ldots, IBI_N\})$), IBI minimum value ($\min_{IBI}=\min(\{IBI_1, \ldots, IBI_N\})$), IBI range ($Range_{IBI}=\max_{IBI}-\min_{IBI}$), IBI standard deviation $$\left(\sigma_{IBI} = \sqrt{\frac{1}{N}\sum_{i=1}^{N}(IBI_i - \overline{IBI})^2}\right),$$

root mean squared of the difference of adjacent IBIS $$\left(\sqrt{\frac{\sum_{i=2}^{N}(IBI_i - IBI_{i-1})^2}{N-1}}\right),$$

total power $$\left(\frac{\sum_{i=1}^{N} IBI_i^2}{N}\right),$$

number of pairs of adjacent IBIs whose difference is more than 50 ms within a given length of measurement time $$\left(\sum_{i=1}^{N} I((IBI_i - IBI_{i-1}) > 50 \text{ ms})\right),$$

percentage of pairs of adjacent IBIs whose difference is more than 50 ms within a given length of measurement time $$\left(\frac{\sum_{i=1}^{N} I((IBI_i - IBI_{i-1}) > 50 \text{ ms})}{N} \times 100\right).$$

The frequency domain features are not easily extracted, since the raw RRI data is not sampled at equal intervals. The frequency domain features used from the power spectrum density (PSD) of the RRI data are: power of the low frequency band $$\left(LF = \sum_{i=0.04\ Hz}^{0.15\ Hz} \mathcal{F}(IBI)_i\right),$$

power of the high frequency band $$\left(HF = \sum_{i=0.15\ Hz}^{0.4\ Hz} \mathcal{F}(IBI)_i\right),$$

and ratio of the low frequency over the high frequency (LF/HF), which expresses the balance between the sympathetic nervous system and the parasympathetic nervous system activity. This information is computed based on the real-time data collected from the PPG (202).

From the galvanic skin response signal (GSR), dynamic range (DR=max(GSR)−min(GSR)), standard deviation $$\left(\sigma_{GSR} = \sqrt{\frac{1}{N}\sum_{i=1}^{N}\left(GSR_i - \overline{GSR}\right)^2}\right)$$

and spectral power energies over specific bands $$\left(F1 = \sum_{i=0.2\ H}^{0.1\ Hz} \mathcal{F}(GSR)_i,\right.$$
$$\left. F2 = \sum_{i=0.3\ H}^{0.2\ Hz} \mathcal{F}(GSR)_i,\ F3 = \sum_{i=0.4\ H}^{0.3\ Hz} \mathcal{F}(GSR)_i\right)$$

are extracted. This information is computed based on the real-time data collected from the GSR (205).

From the accelerometer data ($ACC_x$, $ACC_y$, $ACC_z$), linear acceleration series ( $$\left(ACC_{linear} = \sqrt{ACC_x^2 + ACC_y^2 + ACC_z^2}\right)$$

and its standard deviation ($\sigma_{ACC_{linear}}$) and mean ($\overline{ACC_{linear}}$) are calculated. This information is computed based on the real-time data collected from the accelerometer (201).

From the gyroscope data, maximum value over each axis is extracted. This information is computed based on the real-time data collected from the gyroscope (203).

From the thermometer data, its average value is calculated. This information is computed based on the real-time data collected from the thermometer (204).

Figure 5:
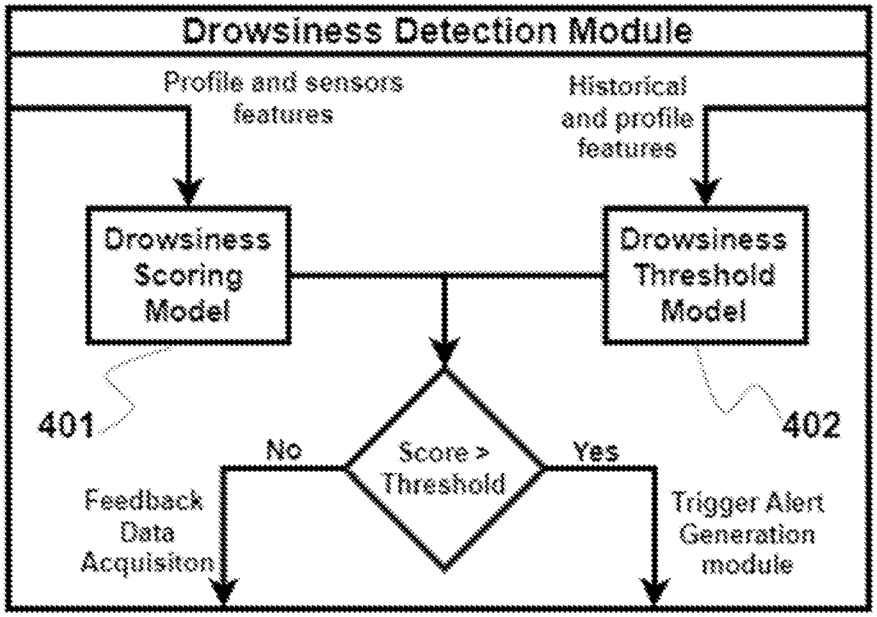
FIG. 5 illustrates a flow diagram of a drowsiness detection module according to an exemplary embodiment of the present invention.

The drowsiness detection module (107) in FIG. 5 receives all the calculated features in a numeric array.

It is implied that the features are already normalized/scaled to be fed to the detection model. The processing unit is running the scoring model (401), which includes a machine learning model.

Considering that a sleep signal shows some temporal patterns during each stage, non-temporal models cannot capture this interdependence between time periods and therefore a recurrent model that captures the previous state to predict the current state must be applied. The short-term recurrent models can solve this problem by formulating the task as $\tau=\{Y, P(Y_t|\chi_t, \chi_{t-1})\}$.

In this sense, the characteristics of the previous time t−1 to enable the model to learn the epoch-to-epoch characteristics of the signal are added. The Long Short-Term Memory (LSTM) is an appropriate method to be applied in the scenario of the present invention. Each of the LSTM cells is made of memory units that can store long-term information from time series, and produce an output based on the current time input, the last output, and the internal memory state.

The drowsiness scoring model (401) is designed to receive as inputs all previously mentioned features extracted from the sensors in real time as well as the profile data.

Figure 6:
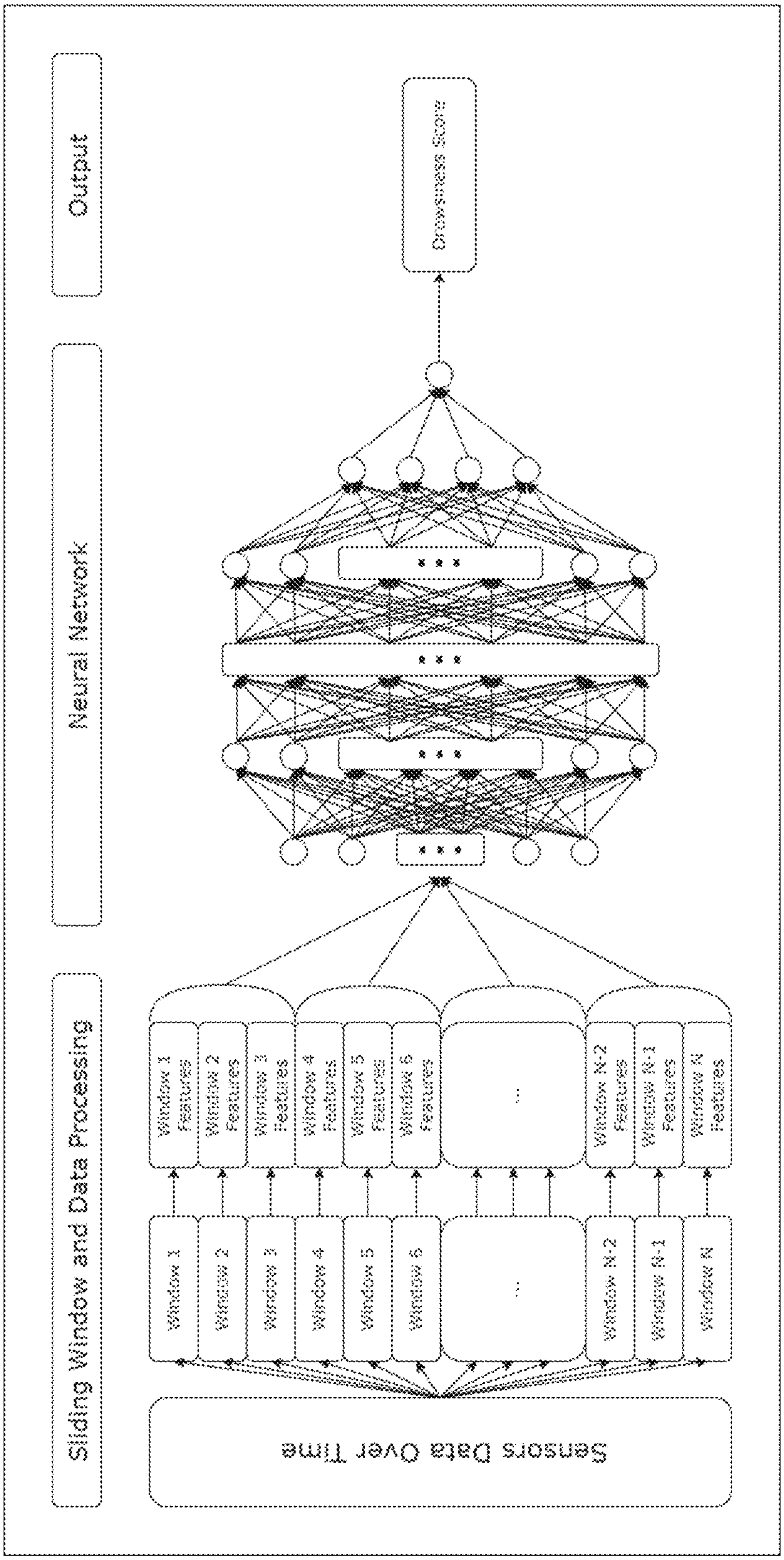
FIG. 6 illustrates a diagram of a drowsiness score model according to an exemplary embodiment of the present invention.

FIG. 6 shows an example of a neural model that can produce the drowsiness score. The set of features are extracted from pre-defined slices of time t. The present invention slices windows of time t over the input signal and calculate all features mentioned in the real-time signal feature extraction section.

After feature extraction and feature reduction, these sensor-based features are combined with profile data from each individual. Then they are finally fed as input to a recurrent neural network, which produces a drowsiness score.

The drowsiness event is only triggered when the score surpasses a threshold, which is the output of a function that receives the historical and profile-based features. Such function is modeled also using a machine learning method (402) that outputs a personalized threshold for detecting the drowsiness state.

Figure 7:
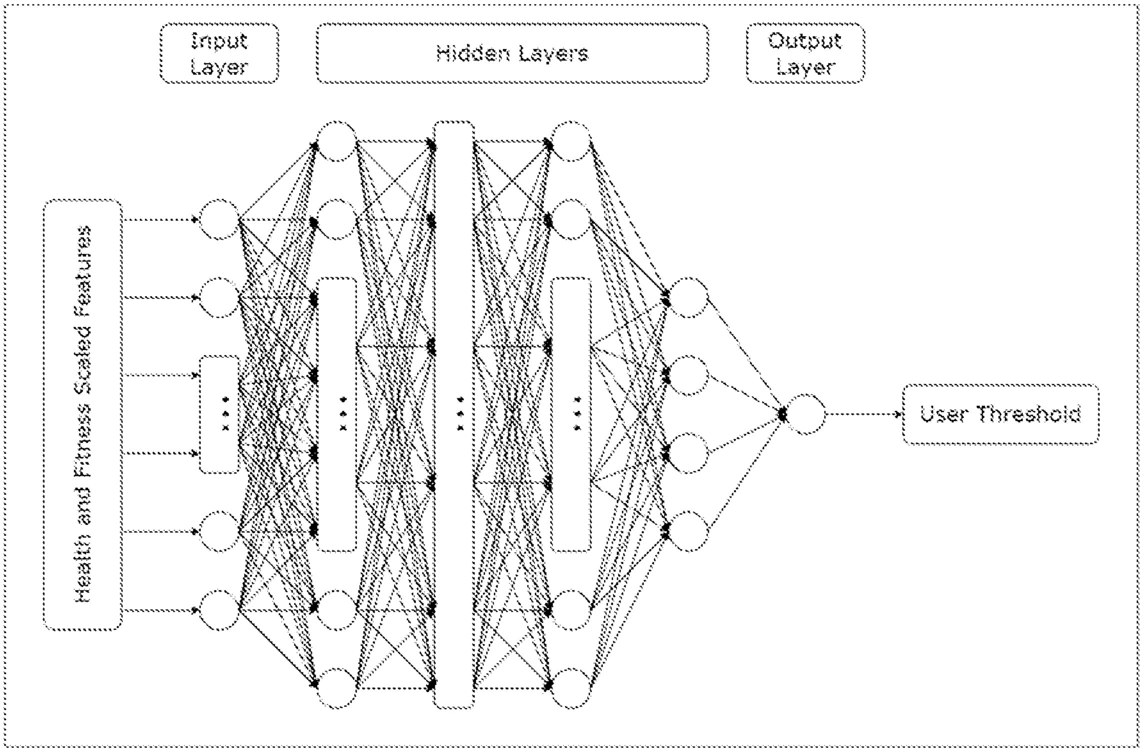
FIG. 7 illustrates an example using neural network to estimate the user drowsiness threshold according to an exemplary embodiment of the present invention.

FIG. 7 shows an example of the drowsiness threshold model architecture.

The drowsiness threshold model takes as input the historical and the profile data to produce a personalized threshold value. It should be noted that each node in the input layer of the architecture receives a feature based on the health and fitness historical data, and demographic information described in the health and fitness features extraction section. After the training process, the network rules are properly defined, and the output is the best drowsiness threshold for each user.

When the score produced by the drowsiness score model is higher than the threshold from the drowsiness threshold model, then the alert generation module is triggered. If the score is lower than the threshold, there is no alert, and a record of the current state is sent back to the data acquisition module.

Figure 8:
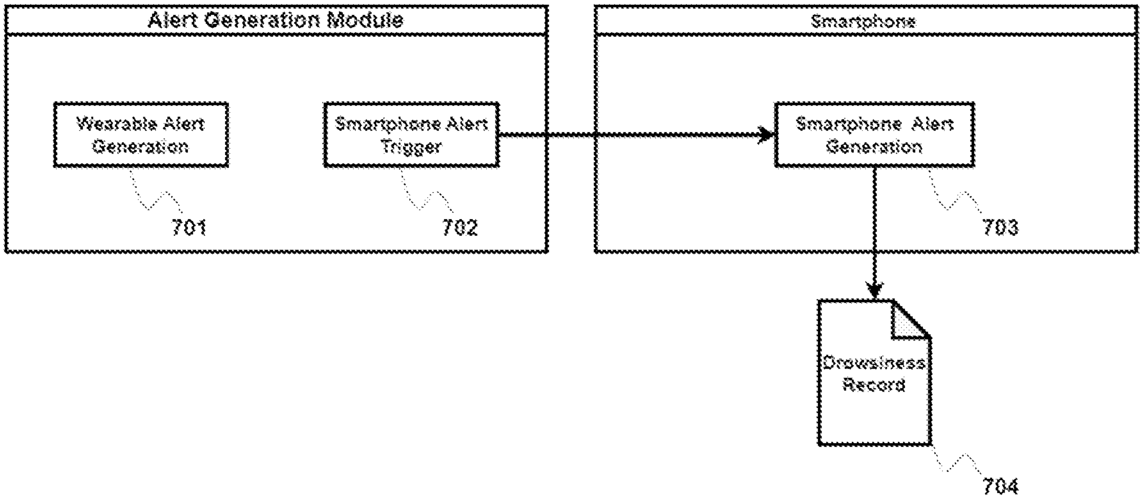
FIG. 8 illustrates a diagram of the alert generation module according to an exemplary embodiment of the present invention.

The alert generation module in FIG. 8 includes a wearable alert generation (701), a Smartphone alert trigger (702), a smartphone alert generation (703) and a drowsiness record (704). The method for drowsiness detection is triggered when a drowsiness event is detected in the drowsiness detection module. The wearable alert generation (701) shows a visual on-screen notification, an audible notification, and a vibration signal in the wearable. The Smartphone alert trigger (702) connects the wearable with the smartphone to induce an alert in the smartphone. The Smartphone alert generation (703) is triggered by the Smartphone alert trigger (702) and may include a visual on-screen notification, an audible notification, and a vibration signal. The drowsiness trigger also generates a record (704), which is created by the smartphone alert generation (703). The drowsiness record contains information regarding health/fitness and the sensors data that generated the drowsiness event.

As new users may have little or no initial health and fitness history data to be used by the method, one of the alternatives is to provide different health and fitness profiles and the user will have the possibility to select the one that best suits their own needs. For instance, the profile may be selected based on questionnaires that encompass, but is not limited to age, sex, weight, height, the physical activities that the user usually do, the sleep quality of the last few days, the use of medications and the fatigue scale that the user feel at the moment.

Gradually the initial profile data will be replaced with the personalized data inserted by the user and collected by the sensors during the normal use of the wearable device. It is important to note that the initial profiles, provided for new users with no health and fitness historical data, may be developed using data from real users with the possibility to be updated dynamically as the initial profile's characteristics are improved. The data to improve the initial profiles characteristics may be obtained by other users when granting the access to the personal data.

Although the present invention has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A hybrid system for multi scenario drowsiness detection using real-time and historical data on a wearable device, the hybrid system comprising:

a data acquisition module to acquire physiological and behavioral data from embedded sensors of the wearable device;

a data processing module to process data by performing pre-processing and feature extraction;

a drowsiness detection module to identify whether a user is drowsy based on the physiological and behavioral data acquired from the embedded sensors of the wearable device in combination with the historical data of the user; and an alert generation module to alert the user, wherein based on the drowsiness detection module identifying a non-drowsiness state, an output of the drowsiness detection module is directly fed back in the data acquisition module as an input for future re-evaluation drowsiness of the user, and wherein based on the drowsiness detection module identifying a drowsiness state as being detected, the alert generation module alerts the user.

2. The hybrid system as in claim 1, wherein the data acquisition module comprises a health/fitness database with the historical data and real time sensors data collected from an accelerometer, a PPG, a gyroscope, a thermometer and a galvanic skin response (GSR) sensor.

3. The hybrid system as in claim 1, wherein any type of sensor that captures a PPG signal of an individual user is enabled to be employed in PPG module.

4. The hybrid system as in claim 1, wherein the data processing module comprises a pre-processing module and a feature extraction module.

5. The hybrid system as in claim 1, wherein the hybrid system uses historical health and behavioral data including information regarding one or more health indicators, as stress, sleep quality, medicines, blood glucose, and muscular inflammation.

6. The hybrid system as in claim 1, wherein the hybrid system uses a stress index that is measurable by the user and that provides a value in a range of 0 to 100, which is collected from a data source.

7. The hybrid system as in claim 1, wherein a muscle wear index is defined as:

$$\sum_{w_i \in W} (\alpha \times T(w_i)) + (\beta \times I(w_i)) + (\delta \times D(w_i))$$

wherein elements α, β and δ in the muscle wear index represent weights associated with a type, an intensity, and a duration of a workout, respectively.

8. The hybrid system as in claim 1, wherein a metric that indicates whether sleep sessions during a day x reached a minimum level defined as:

$$Q(S_x) = \frac{\sum_{s \in S_x} \text{time}(s) \times \text{score}(s)}{M}$$

is used by the hybrid system.

9. The hybrid system as in claim 1, wherein the hybrid system uses a feature that consider user historical sleep quality defined as:

$$\sum_{i=0}^{k} Q(s_i) \times \frac{1}{2^i}$$

wherein k is calibrated for each user, and assuming a day 0 refers to a present day and day j, such that j>0, refers to the j past days.

10. The hybrid system as in claim 1, wherein the hybrid system uses a feature that considers user historical sleep quality which is alternatively defined as:

$$\sum_{i=0}^{k} Q(s_i) \times w_i$$

wherein $w_i$ is a weight associated with an i-th last day.

11. The hybrid system as in claim 1, wherein the hybrid system uses a data source enabled to collect age, sex, weight, and height as profile data.

12. The hybrid system as in claim 1, wherein the hybrid system uses a classification model classifies a signal as being drowsiness onset or not drowsiness onset.

13. The hybrid system as in claim 1, wherein the drowsiness detection module includes a drowsiness scoring model, which is designated to receive data extracted from the embedded sensors in real time, profile data as inputs, and a drowsiness threshold model, which outputs a personalized threshold for detecting the drowsiness state.

14. The hybrid system as in claim 1, wherein the alert to the user by the alert generation module comprises one of a visual notification on a screen, an audible notification or a vibration signal.

15. The hybrid system as in claim 1, wherein the alert generation module includes a wearable alert generation, a smartphone alert trigger, a smartphone alert generation and a drowsiness record, and the system is triggered when the drowsiness state is detected in the drowsiness detection module.

16. A hybrid method for multi scenario drowsiness detection using real-time and historical data on a wearable device, the hybrid method comprising:

acquiring physiological and behavioral data from embedded sensors of the wearable device;

processing data by pre-processing and feature extraction; and identifying whether a user is drowsy based on algorithm of a drowsiness detection module which uses the physiological and behavioral data acquired from the embedded sensors of the wearable device in combination with the historical data of the user, wherein based on a non-drowsiness state being identified at the drowsiness detection module, an output is directly fed back in a data acquisition module as an input for future re-evaluation drowsiness of the user, and wherein based on a drowsiness state being identified as being detected, alerting the user.

17. The hybrid method as in claim 16, wherein, the alerting of the user provides an alert notification, and after the alert notification is received, drowsiness record including information regarding health/fitness and sensor data that generated the drowsiness state is fed back in the data acquisition module for future re-evaluation.

18. The hybrid method as in claim 16, wherein the hybrid method uses user sleep quality history information, which is collected from a data source.

19. The hybrid method as in claim 16, wherein the processing data further comprises:

filtering a PPG signal to remove motion artifacts using an adaptive Least Mean Squares (LMS) technique, using accelerometers as reference signals, and filtering band pass between 0.1 Hz and 5 Hz;

normalizing PPG, accelerometer, gyroscope and thermometer signals to predefined ranges; and performing pre-processing and feature extraction including health/fitness filtering, performing outlier detection and removal for multi scenario drowsiness detection using real-time and historical data on a wearable device that adjusts future re-evaluation of drowsiness of a user based on current drowsiness detection.

* * * * *